US012144767B2

(12) United States Patent
Joyce et al.

(10) Patent No.: US 12,144,767 B2
(45) Date of Patent: Nov. 19, 2024

(54) DYNAMICALLY ADJUSTABLE WIDTH WHEELCHAIR

(71) Applicant: Purdue Research Foundation, West Lafayette, IN (US)

(72) Inventors: Quinn Alexander Joyce, Naperville, IL (US); Eric Eagon, Des Peres, MO (US)

(73) Assignee: Purdue Research Foundation, West Lafayette, IN (US)

( * ) Notice: Subject to any disclaimer, the term of this patent is extended or adjusted under 35 U.S.C. 154(b) by 347 days.

(21) Appl. No.: 17/218,514

(22) Filed: Mar. 31, 2021

(65) Prior Publication Data

US 2021/0338501 A1 Nov. 4, 2021

Related U.S. Application Data

(60) Provisional application No. 63/018,097, filed on Apr. 30, 2020.

(51) Int. Cl.
*A61G 5/10* (2006.01)
*A61G 5/08* (2006.01)
*A61G 5/12* (2006.01)

(52) U.S. Cl.
CPC ......... *A61G 5/1062* (2013.01); *A61G 5/0825* (2016.11); *A61G 5/122* (2016.11)

(58) Field of Classification Search
CPC ...... A62G 5/003; A62G 5/122; A62G 5/0825; A62G 5/1062; A62G 7/1067
USPC .................................. 280/5.504, 144, 250.1
See application file for complete search history.

(56) References Cited

U.S. PATENT DOCUMENTS 6,428,029 B1 * 8/2002 Barclay ................ A61G 5/1081 280/281.1
9,655,794 B2 * 5/2017 Bednarz, III ........ A61G 5/1062
2005/0248143 A1 * 11/2005 Sato ......................... A61G 5/08 280/793

(Continued)

FOREIGN PATENT DOCUMENTS

EP 2722028 A1 * 4/2014 ............ A61G 5/045
KR 1788177 B1 * 10/2017 ............ A61G 5/022

OTHER PUBLICATIONS

Elizabeth, “Airport wheelchair assistance: a first experience,” dated May 16, 2016, available online at URL https://eisurelyseekingdoctorate.wordpress.com/2016/05/16/airport-wheelchair-assistance-a-first-experience/.

(Continued)

*Primary Examiner* — Jacob D Knutson
*Assistant Examiner* — Felicia L. Brittman-Alabi
(74) *Attorney, Agent, or Firm* — Purdue Research Foundation

(57) ABSTRACT

An adjustable wheelchair and components thereof are provided. The wheelchair may include a first chassis connected to a first wheel on a first side of the wheelchair. The first chasses may include a first strut configured to laterally translate while supporting a seat. The wheelchair may further include a second chassis connected to a second wheel on a second side of the wheelchair. The second chasses may include a second strut configured to laterally translate while supporting the seat. A jack may be connected to the first chasses and second chasses. The jack may operatively cause the first and second chassis expand away from each other and contract toward each other to vary a width between the first side and second side of the wheelchair.

17 Claims, 6 Drawing Sheets

(56) References Cited

U.S. PATENT DOCUMENTS

2013/0257009 A1 10/2013 Rogers
2018/0014989 A1* 1/2018 Levine .................. A61G 5/104

OTHER PUBLICATIONS

Rehabmart, "Replacement Parts for the AisleMaster Aisle Transfer Chairs," dated Aug. 17, 2017, Retrieved online ViaWayback Machine at URL https://web.archive.org/web/20170817143129/https://www.rehabmart.com/product/replacement-parts-for-the-aislemaster-aisle-transfer-chairs-18854.html.

Morris, J., "Scapegoating: Airlines, Contractors & Disabled Passengers," WheelchairTravel.org, dated Jul. 23, 2018, available online at URL https://wheelchairtravel.org/scapegoating-airlines-contractors-disabled-passenger/.

De Lollis, B., "Airlines Tackle Wheelchair Need," USA Today, dated Jan. 8, 2009, available online at URL https://abcnews.go.com/Travel/BusinessTravel/story?id=4441923page=1.

Sullivan, D., "Holding Airlines Accountable by Protecting Wheelchair-Bound Passengers," Stepp and Sullivan Public Consulting, dated Aug. 21, 2019, Retrieved online via Wayback Machine at URL https://web.archive.org/web/20201129044705/https://www.ss-pc.com/airline-lawsuit-wheelchair-accident/.

Wright, E., "Airports are Failing Disabled Passengers, and We are Tired of It," The Guardian, dated Aug. 14, 2017, available online at URL https://www.theguardian.com/commentisfree/2017/aug/14/airports-failing-disabled-travellers-wheelchair-assistance-paralympic.

Mather, M., "Fact Sheet: Aging in the United States," dated Jul. 15, 2019, available at URL https://www.prb.org/aging-unitedstates-fact-sheet/.

Lewine, H., "Two-thirds of seniors need help doing one or more daily activities," dated Dec. 13, 2013, Harvard Health Publishing, available online at URL https://www.health.harvard.edu/blog/two-thirds-of-seniors-need-help-doing-one-or-more-daily-activities-201312136942.

AndyMark, "6 in. SR Mecanum Wheels," dated Dec. 1, 2019, Retrieved online via Wayback Machine at URL https://web.archive.org/web/20191130225339/https://www.andymark.com/products/6-in-sr-mecanum-options.

Darcy, S., "Flying With Impairments: Improving Arline Practices by Understanding the Experiences of People With Disabilities," Travel and Tourism Research Association: Advancing Tourism Research Globally, dated 2007, pp. 60-70, 2007 ttra International Conference, available online at URL https://faachallenge.nianet.org/wp-content/uploads/FLYING-WITH-IMPAIRMENTS_-IMPROVING-AIRLINE-PRACTICES-BY-UNDERSTAN.pdf.

United States Census Bureau, "Nearly 1 in 5 People Have a Disability in the U.S. Census Bureau Reports," dated Jul. 25, 2012, available online at URL https://www.census.gov/newsroom/releases/archives/miscellaneous/cb12-134.html.

The Federal Aviation Administration, "Airport Civil Rights Programs," dated dated Oct. 25, 2017, Retrieved online via Wayback Machine at URL https://web.archive.org/web/20171025110258/https://www.faa.gov/about/office_org/headquarters_offices/acr/com_civ_support/.

The Federal Aviation Administration, "Airport Disability Compliance Program (ADCP)," dated Jun. 30, 2017, Retrieved online via Wayback Machine at URL https://web.archive.org/web/20170630125211/https://www.faa.gov/about/office_org/headquarters_offices/acr/com_civ_support/disability_compliance/.

United States Congress, Code of Federal Regulations, Title 14, Section 382, dated Sep. 22, 2021, Retrieved online via Wayback Machine at URL https://web.archive.org/web/20210924214849/https://www.ecfr.gov/current/title-14/chapter-II/subchapter-D/part-382.

* cited by examiner

DYNAMICALLY ADJUSTABLE WIDTH WHEELCHAIR

CROSS REFERENCE TO RELATED APPLICATIONS

This application claims the benefit of U.S. Provisional Application No. 63/018,097 filed Apr. 30, 2020, the entirety of which is incorporated by reference.

TECHNICAL FIELD

This disclosure relates to wheelchair and, in particular, to adjustable wheelchair components.

BACKGROUND

Physically disabled travelers require more assistance than other passengers. In order to provide services to disabled travelers, airlines and/or transportation hubs commonly hire contractors to care for and transport physically disabled passengers in the airport. These contractors use tools that are common across transportation hubs in the United States to aid in the transportation of disabled passengers. Examples of these tools include the common airport wheelchair, aisle chair, and the airport buggy. For example, the buggy helps to transport passengers through the airport who cannot walk extremely far without assistance, while the aisle chair allows passengers with limited or no mobility in their lower extremities to board a plane and move to their seat. While the tools are helpful in transporting disabled passengers, they are all very different from one another and are dependent on the contractors to provide the experience for the passengers. Moreover, a disabled user must transition between various types of mobility assistance devices between arrival at the airport and aircraft boarding.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

The path between arrival and departure for various forms of commercial transportation may create obstacles for disabled users. For example, crowded and narrows isles encountered in most commercial aircrafts are not suited for standard wheelchairs. According, an adjustable base wheelchair and related methods are provided.

By way of introductory example, an adjustable width wheelchair may include a base. The base may include a first chassis, a second chassis, and a jack connected to the first chasses and second chasses. The first chassis may connect to a first wheel (or wheels) on a first side of the wheelchair. The second chassis connected to a second wheel (or wheels) on a second side of the wheelchair. An electrically powered actuator may selectively cause the jack to adjust a distance between the first chassis and the second chassis to vary a width of the wheelchair while the wheelchair is occupied.

An advancement provided by the wheelchair described herein is that the wheelchair is expandable/contractable to accommodate traversal of transportation hubs and transportation vehicles. For example, the wheelchair may be adjustable to accommodate boarding/deboarding of aircraft or types of commercial transportation vehicles. In some embodiments, the wheelchair may have a standard 23-inch wheelbase which is contractable to a 14-inch wheelbase to maneuver commercial airplane aisles. The wheelchair may include a split chassis connected by load-bearing linear slides and a powered jack. In some embodiments, a scissor jack offers excellent mechanical advantage and allows a small motor to operate the jack with little power. In some embodiments, the chair seat and armrests may compress to achieve a reduced chair width. In some examples, the chair may include a double-hinged armrest that folds behind the seatback and a 3-piece seat cushion-a 14-inch middle section surrounded by two 4-inch sections. The two outer sections fold down underneath the seat when the chair compresses. Additional and alternative examples of the seat are described herein. The benefits, efficiencies, and improvements over existing market solutions are made evident in the content described herein.

Figure 1:
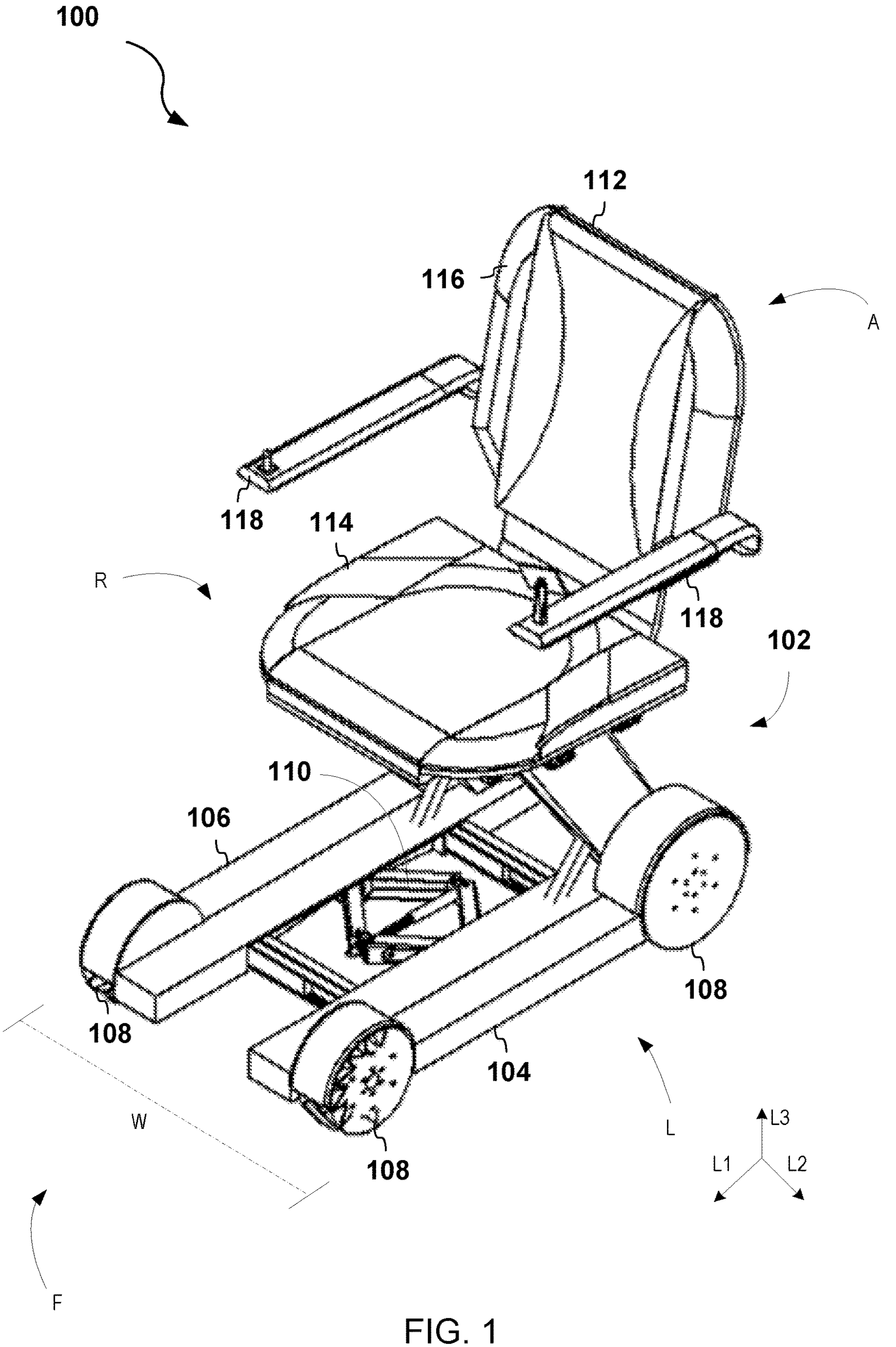
FIG. 1 illustrates a perspective view of an example of a wheelchair.

FIG. 1 illustrates a perspective view of an example of a wheelchair 100. Throughout the following discussion of the wheelchair 100 and its components, the terms left, right, forward, aft, top and bottom are oriented with respect to an occupant of the chair. Thus, the left side L is the side of the wheelchair 100 is oriented to left of an occupant of the chair 100. The term longitudinal direction (L1 in FIG. 1) refers to a direction extending from the aft side A to the forward side F of the wheelchair 100. The lateral direction L2 refers to the direction that extends from the left side L to the right side R. The height direction L3 refers to a direction extending away from a bottom of the wheelchair 100.

The wheelchair may include a base 102. The base 102 may include a first chassis 104 and a second chasses 106. The base 102 may further include and/or connect to wheels 108. For example, the first chassis 104 may connect to a first wheel, or first set of wheels, and the second chassis 106 may connect to a second wheel, or set of wheels. The first chassis 104 may be located on the left side L of the wheelchair and the second chassis 106 may be located on the right side R of the wheelchair. In some examples, additional components between the wheels and chassis may be present, such as axis, swing arms, etc.

The width W of the wheelchair 100 may vary as the base 102 is expanded and contracted. The width W of the wheelchair 100 is the distance between the side L and the second side R of the wheelchair 100. As the first chassis 104 and second chassis 108 expand apart, the width W of the wheelchair 100 may increase. As the first chassis 104 and the second chassis 106 contract, the width of the wheelchair my decrease.

In some examples, the wheelchair may include a jack 110 that is adjustably connected to the first and second chassis. The jack 110 may include a device that can be adjusted to expand and contract. For example, the jack 110 may include a scissor jack as illustrated in FIG. 1. Alternatively, the jack 110 may include a bottle jack, a pneumatic jack, and/or any other suitable jack that can expand and contract through hydraulic, pneumatic, and/or mechanical actuation. The jack 110 may be positioned between the first and second chasses. Expansion of the jack 110 may cause the distance between the first and second chassis to increase. Contraction of the jack 110 may cause the distance between the first and second chasses to decrease.

The wheels 108 may facilitate movement in multiple directions, such as the longitudinal direction (L1) and the lateral direction (L2), or their opposites. Alternatively or in addition, the wheels 108 may facilitate zero degree turning. In some examples, the wheels 108, or a portion thereof, may include a mecanum wheel or omnidirectional wheel. The wheels 108 may be driven by one or more motors (see FIGS. 9-10). In some circumstances, mecanum wheels may be preferable omni-wheels or traditional wheels because they provide resistance to lateral motion on an incline (unlike omni-wheels) and provide zero-degree turn capabilities (unlike traditional wheels).

The wheelchair may include a seat 112. The seat 112 may include a seat rest 114, a backrest 116, and/or arm rests 118. The seat rest 114 may receive an occupant for sitting. The backrest 116 may receive and support the back of the occupant. The back rest may follow a plane that intersects the plane of the seat rest 114. The armrests 118 may extend away from the seat rest to accommodate the occupant's arms.

The seat 112 may be supported by the base 102. For example, the seat 112 may connect to the base 102. The first and second chassis may expand/contract beneath the seat 112 to adjust the width of the wheelchair while the seat is deployed. For example, the seat 112 may be occupied while the base expands and/or contracts.

Figure 2:
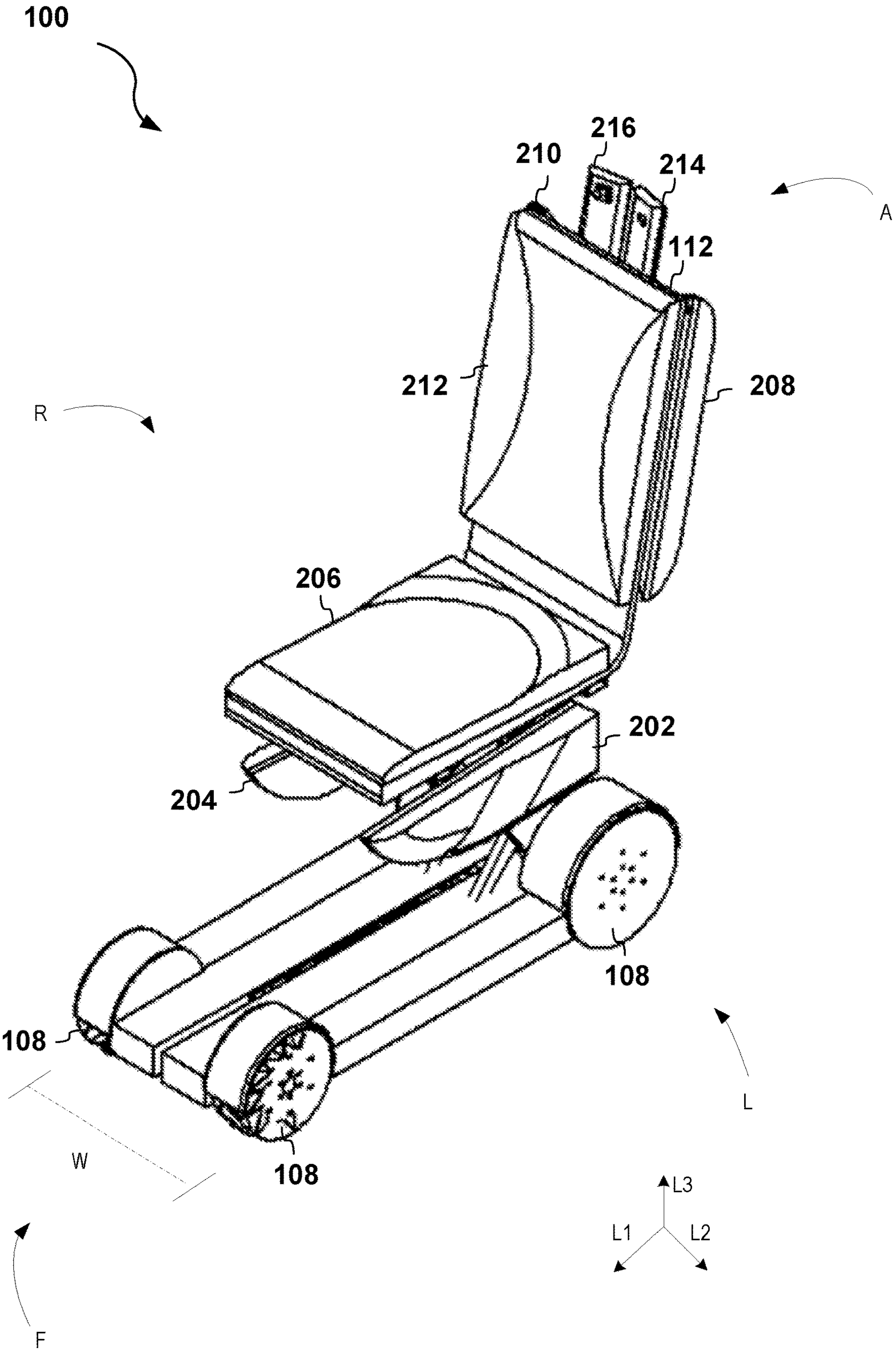
FIG. 2 illustrates an example of a wheelchair in a contracted state.

FIG. 2 illustrates an example of the wheelchair in the contracted state. The width W of the wheelchair 100 may vary as the base 102 is expanded and/or contracted. Since the base 102 can freely move beneath the seat, the seat may define the width W of the wheelchair after the base 102 is contracted. To further minimize the width W of the wheelchair 100, the seat 112 may be adjusted to further minimize the width W.

For example, the seat 112 may include adjustable base flaps 202-204 positioned on the sides of a fixed seat base 206. The adjustable seat base flaps 202-204 may include a first seat flap 202 on the left side L of the wheelchair 100 and a second seat flap 204 on the right side R of the wheelchair 100. When the wheelchair 100 is in the expanded opposition, the seat base flaps 202-204 may be positioned such that the surface of the seat base flaps 202-204 and the surface of the fixed seat base 206 together form a seat surface for comfortable occupancy. The adjustable seat flaps 202-204 may fold down such that the seat surface is no longer defined by the seat flaps 202-204. In other words, the seat flaps 202-204 may rotate between an opened position and a closed position. The seat flaps 202-204 may rotate such that an angle between the fixed seat base and the flaps is less than 180 degrees. Thus, the width W of the wheelchair 100 may be decreased by folding down the seat flaps 202-204.

The seat 112 may further include adjustable back rest flaps 208-210. The back rest flaps 208-210 may include a first back rest flap 208 on the left side L of the wheelchair 100 and a second back rest flap 210 on the right side R of the wheelchair 100. When the wheelchair in in the expanded opposition, the back rest flaps 208-210 may be positioned such that the surface of the back rest flaps 208-210 and the surface of a fixed back rest 212 together form a back rest surface for comfortable occupancy. When the wheelchair 100 is in the closed position, the back rest flaps 208-210 may fold toward the aft A of the wheel chair 100 such that the back rest surface is no longer defined by the back rest flaps 208-210. In other words, the backrest flaps 208-210 may rotate between an opened position and a closed position. When in the closed position, the backrest flaps 208-210 may rotate such that an angle between the fixed back rest 212 and the backrest flaps 208-210, respectively, is less than 180 degrees. Thus, the width W of the wheelchair 100 may be decreased by folding back the backrest flaps 208-210.

The seat may include adjustable arm rests 214-216. The adjustable armrests 214-216 may include a first adjustable armrest 214 on the left side L of the wheelchair 100 and a second adjustable armrest 216 on the right side R of the wheelchair 100. The armrests 214-216 may connect to the backrest flaps 208-210, respectively. When the wheel chair is closed, the adjustable armrests may be positioned behind the wheelchair. When the wheelchair is opened, the armrests may be substantially parallel to the seat for comfortable occupancy.

Figure 3:
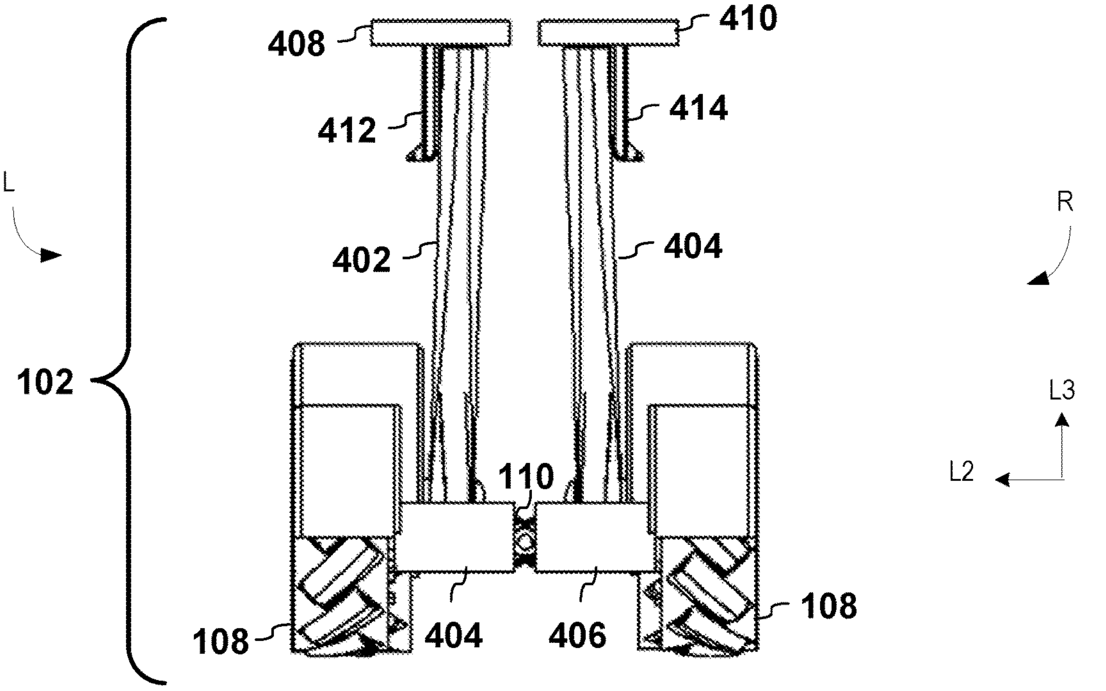
FIG. 3 illustrates an example of a wheelchair base in a contracted state.
Figure 4:
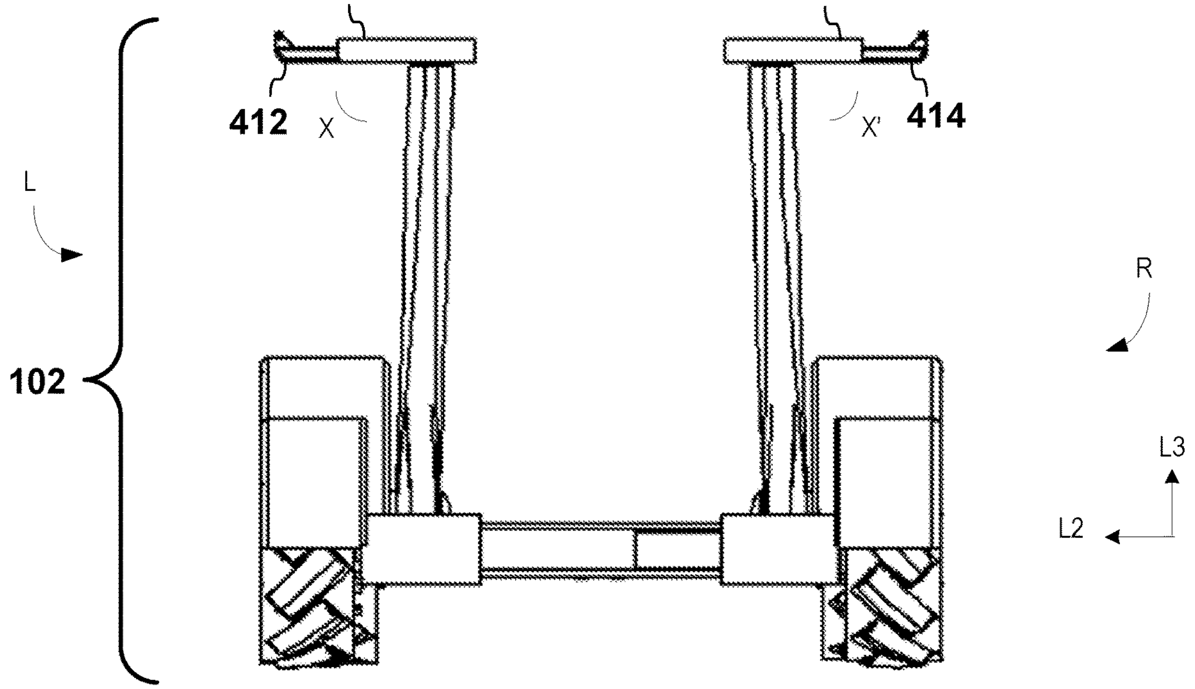
FIG. 4 illustrates an example of a wheelchair base in an expanded state.

FIGS. 3-4 illustrates an example of the base 102 of the wheelchair 100. FIG. 3 illustrates an example of the base in a contracted state. FIG. 4 illustrates an example of the base in the expanded state.

The first and second chassis may include respective struts 402-404 and respective base members 406-408. The struts 402-404 may include a first strut 202 on the left side L of the base 102 and a second strut 204 on the right-side R of the base 102. The base members 404-406 may include a first base member 404 on the left side L of the base 102 and a second base member 406 on the right side R of the base 102.

The base members 404-406 may connect to one or more respective wheels 108 and/or the jack 110. The struts 402-404 may connect to and extend away from the base in the height direction L3. The struts 402-404 may connect to and/or support the seat (the seat of a wheelchair not shown in FIG. 3-4).

The base 102 and/or the left and right chassis may further include seat platforms 408-410. The seat platforms may be included with, or connected to, the struts 402-404, respectively. For example, the seat platform may be positioned, at a first end of the strut and the second end of the strut may be connected to a correspond base member. The seat platform may receive the seat and/or slide along the base of the seat as the base 102 expands and contracts.

The base 102 may further include seat hinges 412-414. The seat hinges 412-414. may connect to the struts 412-414. and/or the seat platforms 408-410. The seat flaps 202-204 (previously described), may connected to the seat hinges. The seat hinges 408-410 may rotate about angles X and X', respectively, to rotate the connected seat base flaps between the expanded and collapsed states.

Figure 5:
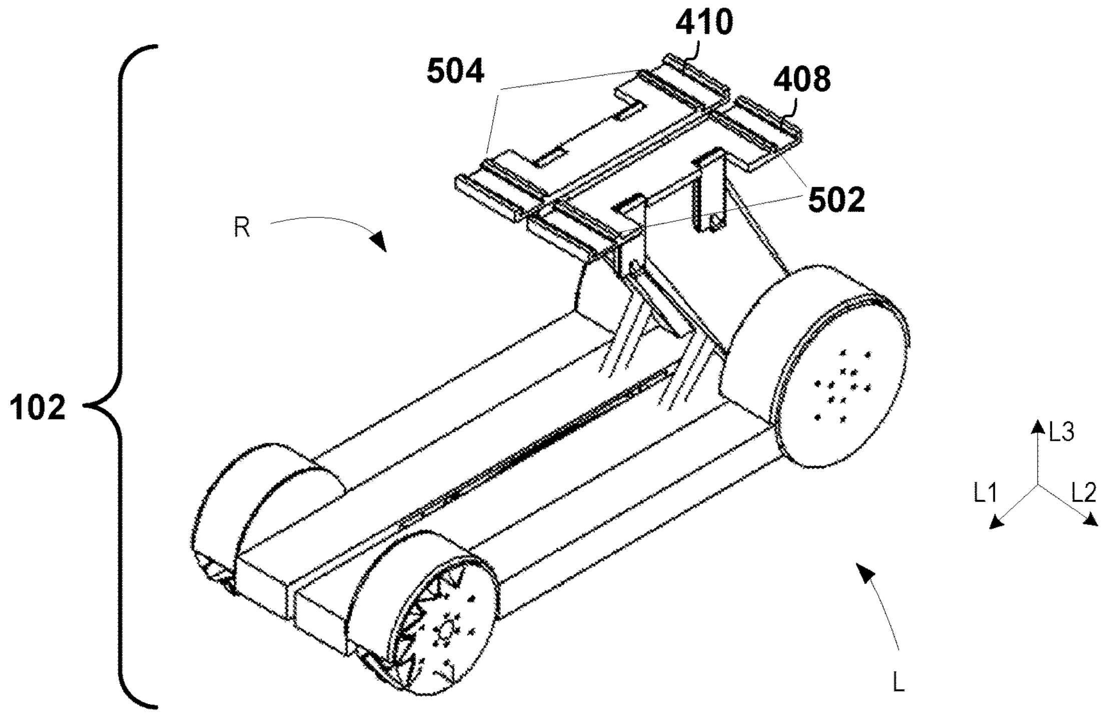
FIG. 5 illustrates a perspective view of a wheelchair base in a contracted state.
Figure 6:
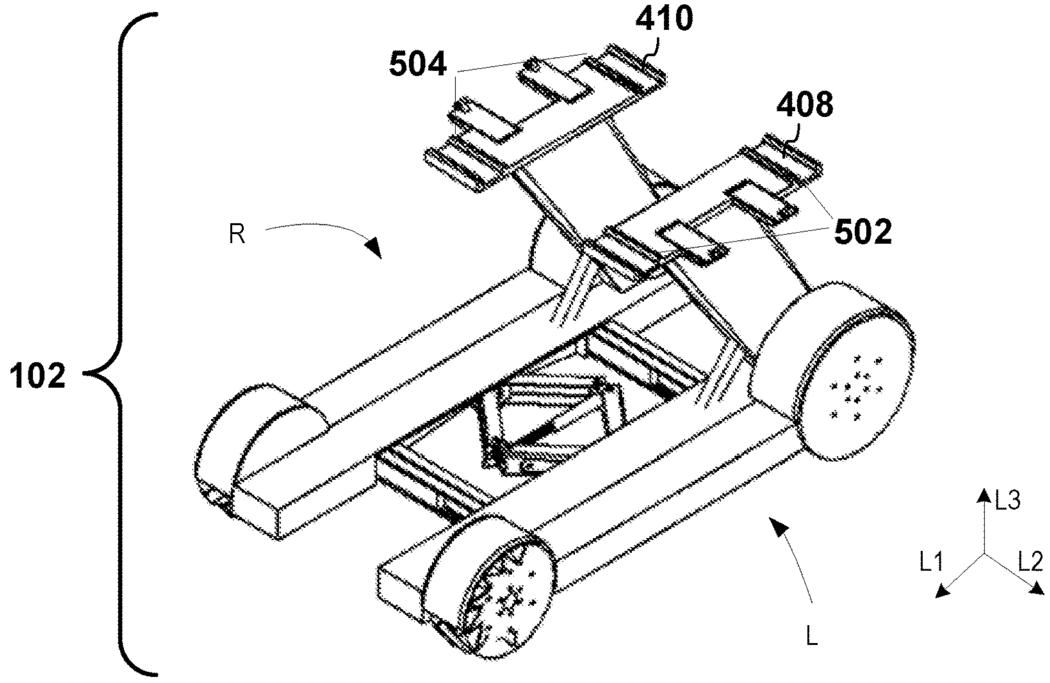
FIG. 6 illustrates a perspective view of a wheelchair base in an expanded state.

FIG. 5 illustrates a perspective view of an example of the base 102 of the wheelchair 100 in the contracted state. FIG. 6 illustrates a perspective view of an example of the base 102 of the wheelchair 100 in the expanded state.

The seat platforms 408-410 may include a respective carriages 502-504. For example, the seat platform 408 may include one or more carriage that extends along the direction L2. The carriages 502-504 may be received by a slide attached to the under-side of the seat (slide shown in FIGS. 7-8). The carriages 502-504 may move along the slide to accommodate movement of the chasses as the wheelchair expands/contracts. In other words, the seat platforms 408-410 may move with respect to direction L2 or its opposite beneath the wheel to facilitate expansion and contraction of the wheelchair 100.

In some examples, the carriage may include a protrusion that extends away from the surface of the seat platform. The cross section of the carriage may correspond to a groove on the bottom slide of the seat.

Figure 7:
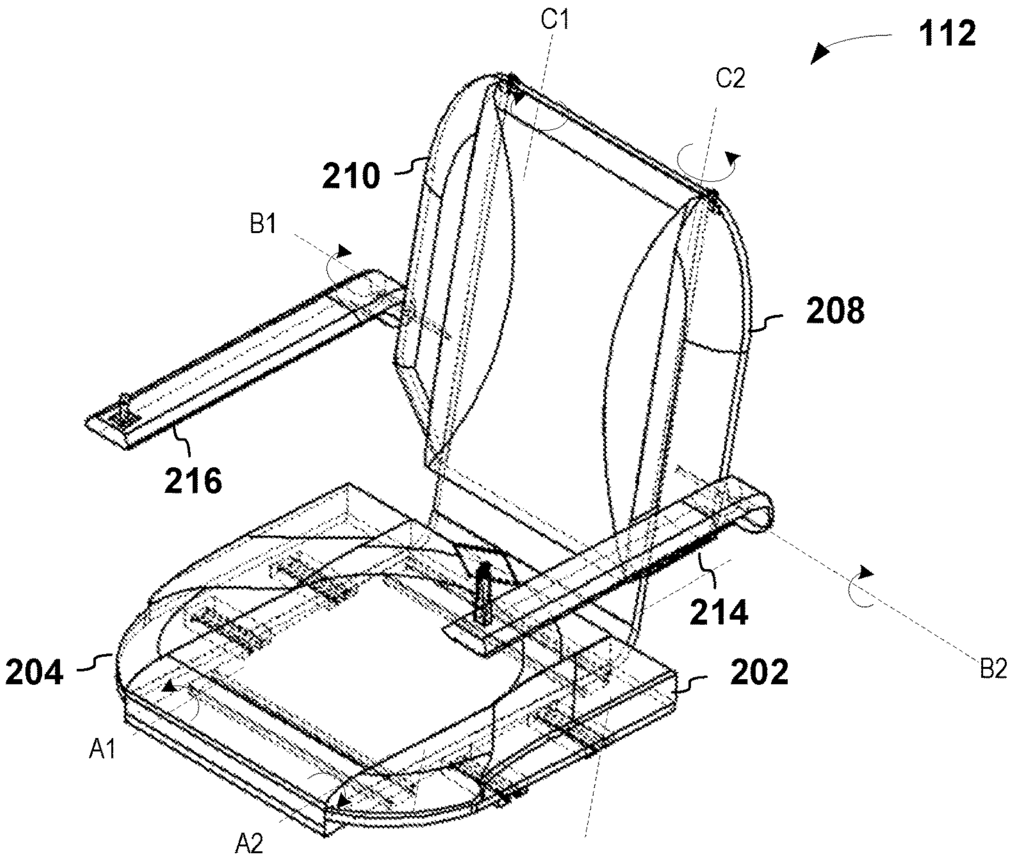
FIG. 7 illustrates a perspective view of a seat.

FIG. 7 illustrates an example of a perspective view of the seat 112. The seat flaps 202-204 may rotate with respect to axis A1 and A2 respectively. Accordingly, the seat flaps 202-204 may be folded down and/or underneath the seat to decrease the width of seat and/or the wheelchair in which the seat is affixed. In some examples, the flaps may be connected to the seat by way of hinges, such as the hinges illustrated in FIGS. 5-6. An actuator such as an electrically powered motor or servo may control rotation of the flaps.

The seat may include adjustable arm rests 214-216. The armrests 214-216 may rotate with respect to axis B1 and B2, respectively, to stow/deploy the armrests. To vary the width of the chair, the seat may include an adjustable backrest. The backrest may include flaps 208-210. The flaps 208-210 may fold with respect to axis C1 and C2, respectively. In various examples, the width of the seat 112 or the wheelchair may be decreased by folding the armrests 118 up so that they are substantial parallel with the flaps 208-210 of the backrest, and then folding the flaps 208-210 and the arm rests 118 behind the seat 112. Thus, the armrests 118 may be connected to the flaps 208-210. In various examples, the flaps 208-210 of the backrest may connect to the central portion of the backrest by way of a first pair of hinges. The armrests may connect to the flaps by way of a second pair of hinges. The first pair of hinges and the second pair of hinges may be driven by one or more electrically powered actuators connected to the hinges.

Figure 8:
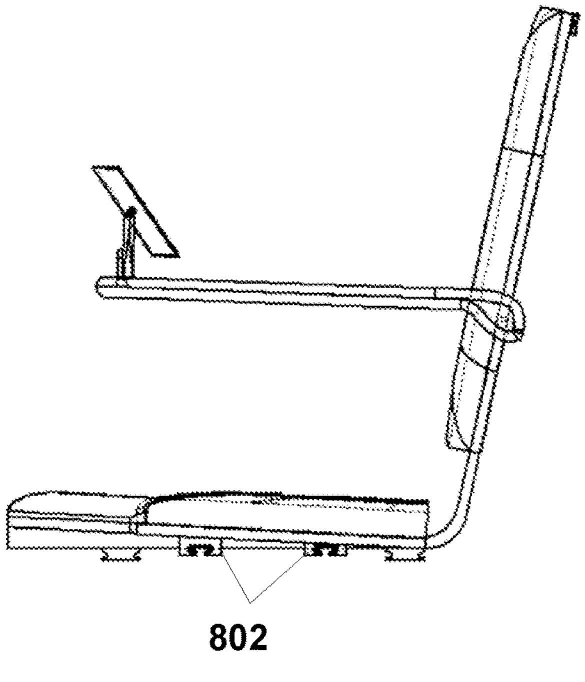
FIG. 8 illustrates a side view of a seat.

FIG. 8 illustrates a side view of the seat. The seat may include one or more rails 802 that receive the base (see FIGS. 4-6). Each rail 802 may include a groove with a cross section that matches the protrusion of the carriage (shown in FIGS. 5-6). For example, the rail may be a component of a linear slide. The carriage on the base may receive the rail to form the linear slide. The carriage and/or rail(s) 802 may include one or more bearings or wheels that allow for low friction sliding. It should be appreciated that in other examples, the base may include the rail and the seat may include the carriage. It is worth noting that the rail(s) 802 of the seat base may not extend only on a fixed (non-folding) part of the seat base. For example, the rails(s) may extend between the flaps of the seat but not onto the flaps of the seat. Accordingly, the flaps of the seat base may rotate without being obstructed by the rails.

Figure 10:
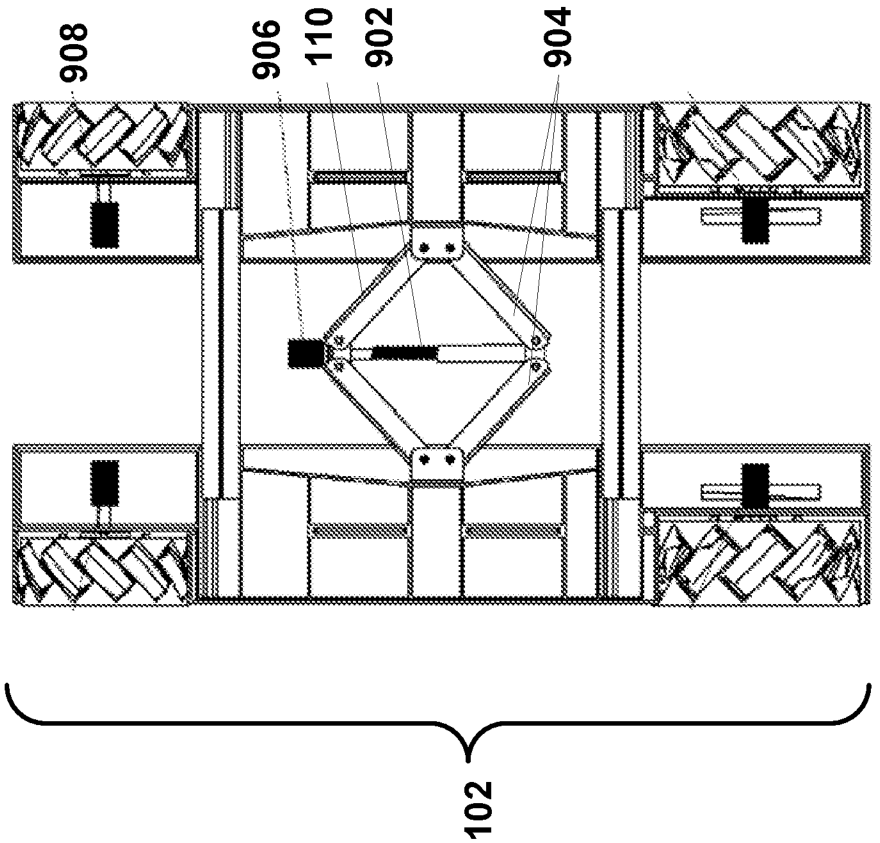
FIG. 10 illustrate a bottom view of a wheelchair base an expanded state.
Figure 9:
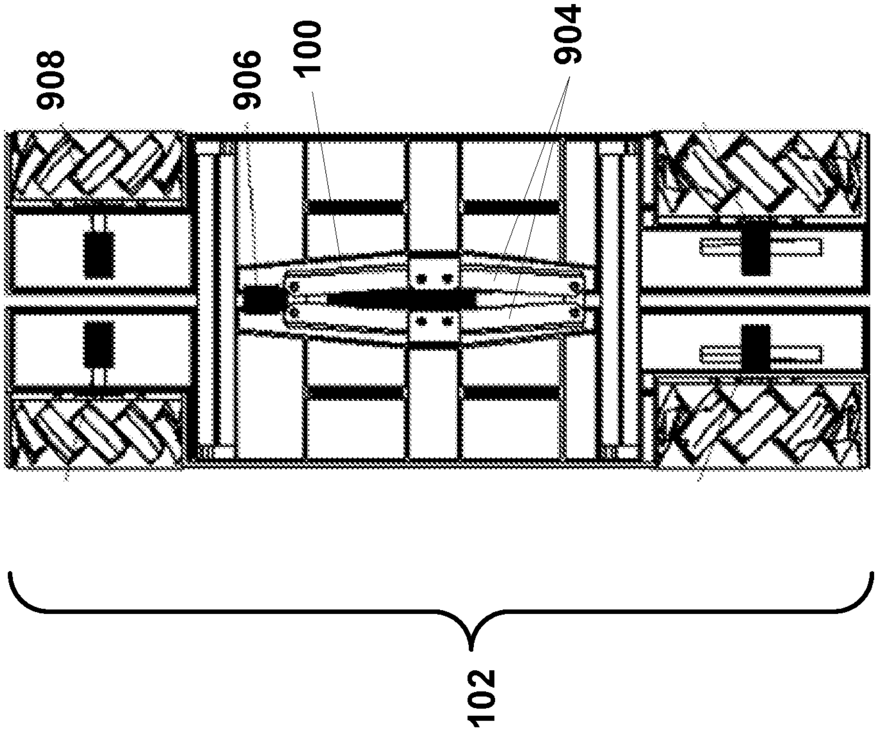
FIG. 9 illustrate a bottom view of a wheelchair base a contracted state.

FIG. 9 illustrate a bottom view of an example of the base of the wheelchair 100 in the contracted state. FIG. 10 illustrates a bottom view of an example of the base of the wheelchair 100 in the expanded state. In some examples, the jack 110 may include a scissor jack. The scissor jack may include a screw 902 and linkages 904. Rotation of the screw 902 in a first direction may cause expansion and rotation of the screw in a second direction may cause contraction of linkages 904. The linkages may include a first leakage and a second linkage. The first linkage may connect to the first chasses and the second linkage may connect to a second chassis. An actuator 906, controlled via electrical signals by an operator or controller, may cause rotation of the screw. Depending on the type of jack, various types of actuators may be used to control the jack. In the case of a scissor jack with a mechanical screw (as shown in FIGS. 4-5), a motor or servo may be used to turn the screw. In the case of hydrophilic or pneumatic jacks, the actuator may include (or control) a pump and/or a valve that varies fluid flow to the jack. The wheelchair may include one or more motor 908 that drives the wheels of the chair.

The actuator and/or motors of the wheelchair may be driven by a controller on the wheelchair. The controller may be, for example, a hardware processor and/or a memory that includes computer readable instructions executable by the processor. The controller may cause electrical signals to be sent to the actuator 906, the motor(s) 908, and/or any other actuator/motors that cause mechanical movement of the jack, seat flaps, back rest flaps, and/or adjustable arrests. In some examples, the controller may receive signals from buttons, joysticks, switches, or other input devices to control operation of the wheelchair.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A wheelchair, comprising:

a seat comprising a rail on a bottom side of the seat;

a first chassis connected to a first wheel on a first side of the wheelchair, the first chassis comprising a first strut configured to laterally translate and slide along the rail while supporting the seat;

a second chassis connected to a second wheel on a second side of the wheelchair, the second chassis comprising a second strut configured to laterally translate and slide along the rail while supporting the seat; and a jack connected to the first chassis and second chassis, the jack operatively configured to cause the first and second chassis to expand away from each other and to contract toward each other to vary a width between the first side and second side of the wheelchair.

2. The wheelchair of claim 1, further comprising:

an electrically powered actuator configured to cause the jack to expand and contract a distance between the first chassis and the second chassis to vary a width of the wheelchair while the wheelchair is occupied.

3. The wheelchair of claim 1, wherein the seat is configured to remain deployed during adjustment of the base.

4. The wheelchair of claim 1, wherein the first wheel and the second wheel comprise mecanum wheels or omni-directional wheels.

5. The wheelchair of claim 1, wherein the first wheel comprises a first pair of wheels and the second wheel comprises a second pair of wheels.

6. The wheelchair of claim 1, wherein the jack comprises a scissor jack.

7. The wheelchair of claim 6, wherein the scissor jack comprises a first linkage attached to the first chassis and a second linkage attached to the second chassis and a screw configured to expand and contract the first and second linkage.

8. The wheelchair of claim 1, wherein the connection between the seat and the first and second struts create a linear slide that enables movement of the struts during expansion and contraction of the first and second chassis.

9. The wheelchair of claim 8, wherein the first and second struts comprise respective carriages, wherein the rail receives the carriages of the struts to create the linear slide.

10. The wheelchair of claim 1, wherein the seat comprises flaps that fold to narrow the width of the seat.

11. The wheelchair of claim 1, wherein the first wheel and the second wheel comprise mecanum wheels or omni-directional wheels.

12. The wheelchair of claim 1, wherein the first wheel comprises a first pair of wheels and the second wheel comprises a second pair of wheels.

13. A wheelchair, comprising:

a first chassis connected to a first wheel on a first side of the wheelchair, the first chassis comprising a first strut configured to laterally translate while supporting a seat;

a second chassis connected to a second wheel on a second side of the wheelchair, the second chassis comprising a second strut configured to laterally translate while supporting the seat; and a jack connected to the first chassis and second chassis, the jack operatively configured to cause the first and second chassis to expand away from each other and to contract toward each other to vary a width between the first side and second side of the wheelchair, wherein the seat comprises a backrest, the backrest comprising flaps configured to fold behind or substantially perpendicular to a central portion of the backrest, wherein the seat further comprises armrests connected to the flaps of the backrest, respectively, wherein the armrests are configured to fold from a horizontal to a vertical position, wherein the armrests are configured to fold behind the backrest in response to the flaps of the backrest being folded.

14. The wheelchair base of claim 13, wherein the jack comprises a scissor jack.

15. The wheelchair base of claim 14, further comprising:

an electrically powered actuator configured to rotate a screw configured to expand and contract linkages connected to the screw.

16. A wheelchair comprising:

a seat comprising a rail on a bottom side of the seat;

a first chassis connected to a first wheel and the seat, the first chassis configured to slide along the rail and support the seat;

a second chassis connected to a second wheel and the seat, the second chassis configured to slide along the rail and support the seat; and a jack configured to move the first and second chassis to vary the width of the wheelchair.

17. The wheelchair of claim 16, wherein the first and the second wheel enable the first and the second chases to move along the ground in a lateral direction perpendicular to a forward direction of the wheelchair.

* * * * *